(12) United States Patent
Parisel et al.

(10) Patent No.: US 9,127,889 B2
(45) Date of Patent: Sep. 8, 2015

(54) APPARATUS

(71) Applicant: INEOS EUROPE AG, Vaud (CH)

(72) Inventors: Marc Parisel, Vilvoorde (BE); Brent R. Walworth, Sint Niklaas (BE)

(73) Assignee: INEOS EUROPE AG, Vaud (CH)

(*) Notice: Subject to any disclaimer, the term of this patent is extended or adjusted under 35 U.S.C. 154(b) by 0 days.

(21) Appl. No.: 14/347,185

(22) PCT Filed: Oct. 9, 2012

(86) PCT No.: PCT/EP2012/069929
§ 371 (c)(1),
(2) Date: Mar. 25, 2014

(87) PCT Pub. No.: WO2013/053684
PCT Pub. Date: Apr. 18, 2013

(65) Prior Publication Data
US 2014/0256890 A1 Sep. 11, 2014

(30) Foreign Application Priority Data
Oct. 10, 2011 (EP) .................................... 11184540

(51) Int. Cl.
*C08F 2/12* (2006.01)
*F27D 1/00* (2006.01)
*F28F 9/26* (2006.01)
*B01J 19/24* (2006.01)
*B01J 19/18* (2006.01)

(52) U.S. Cl.
CPC .............. *F27D 1/00* (2013.01); *B01J 19/245* (2013.01); *B01J 19/2435* (2013.01); *B01J 2219/0004* (2013.01); *B01J 2219/00094* (2013.01)

(58) Field of Classification Search
CPC ............... F27D 1/00; C08F 2/12; C08F 6/24; F28F 9/26
USPC ....... 432/3, 247; 165/144; 422/132; 528/503; 526/72
See application file for complete search history.

(56) References Cited

U.S. PATENT DOCUMENTS

| 3,428,619 A | 2/1969 | Hawkins et al. |
| 4,126,743 A | 11/1978 | Shiomura et al. |
| 2010/0036078 A1* | 2/2010 | Marissal et al. ........... 526/348.4 |

FOREIGN PATENT DOCUMENTS

| EP | 1 914 247 A1 | 4/2008 |
| EP | 2 090 360 A1 | 8/2009 |
| GB | 2 157 701 A | 10/1985 |
| WO | WO 2008/043472 A1 | 4/2008 |
| WO | WO 2008/043473 A1 | 4/2008 |
| WO | WO 2009/011958 A1 | 1/2009 |
| WO | WO 2009/127643 A1 | 10/2009 |
| WO | WO 2009/127645 A1 | 10/2009 |

* cited by examiner

*Primary Examiner* — Fred M Teskin
(74) *Attorney, Agent, or Firm* — Nixon & Vanderhye P.C.

(57) ABSTRACT

Process for producing a polymer product in a slurry polymerization process, which slurry polymerization process includes a slurry heater for heating a stream of polymer product slurry withdrawn from a slurry reactor. The process includes reconfiguring the slurry heater from an initial slurry heater configuration to a subsequent slurry heater configuration and further where the slurry heater is reconfigured to form a subsequent slurry heater having a different total length and/or a different average internal diameter than the initial slurry heater.

20 Claims, No Drawings

APPARATUS

This application is the U.S. national phase of International Application No. PCT/EP2012/069929 filed 9 Oct. 2012 which designated the U.S. and claims priority to European Patent Application No. 11184540.0, filed 10 Oct. 2011, the entire contents of each of which are hereby incorporated by reference.

The present invention relates to slurry polymerisation, and in particular, the heating of slurry withdrawn from a reactor.

In a typical slurry polymerisation process a stream of polymer solids in liquid diluent is withdrawn from a reactor, typically a loop reactor, heated in a slurry heater, and passed to a separations vessel, wherein the polymer solids are separated from vaporised diluent.

The diluent vaporisation can occur in the separations vessel, which may then be referred to as a "flash vessel". However some, and preferably the majority or all, of the vaporisation can occur prior to this, for example in the slurry heater.

A large scale polymerisation process may have a number of parallel slurry withdrawal lines, preferably with slurry heaters dedicated to each withdrawal line designed to provide the required amount of heat. Alternatively a slurry heater may take feed from more than one withdrawal line. A detailed description on polymer stream transfer using one or more slurry heaters can be found in WO 2009/127645.

Most modern polymerisation plants are able to produce a number of different polymer grades. Different grades may be produced under significantly different polymerisation conditions. For example, for technical reasons some grades are produced at lower production rates than others, and hence the slurry withdrawal lines need to be designed to accommodate a range of flow-rates. Similarly, some grades may be produced, or withdrawn, at different solids concentrations, which means that the amount of diluent to be vaporised may be different. As another example, different grades may be produced at different reaction temperatures, which means differing amounts of heat may be needed to be supplied to cause vaporisation of the diluent. As the slurry flow rate and solids concentration varies so too will the velocity profile through the slurry heater. Equally, different grades may have different sintering temperatures, which means differing slurry heater temperatures may be needed to avoid fouling and/or polymer softening in the heater.

In general, the plant's slurry heaters must be designed to be able to vaporise diluent whilst reliably maintaining polymer suspension, maintaining an acceptable pressure drop in the slurry heater and avoiding undesired fouling and/or polymer softening for any grade to be produced. These, and numerous other reasons, mean that a particular design of slurry heater cannot be optimum for all grades to be produced.

Whilst it is possible to provide some flexibility by changing the number of slurry heaters being used, or the amount of heat applied to the slurry in a particular slurry heater, for example the number of sections which are heated, we have now found a more efficient apparatus design which allows slurry heaters to be operated more efficiently over a range of polymer product grades.

Thus, in a first aspect, there is provided a slurry heater apparatus comprising at least two heating sections connected in fluid communication in series to form an initial slurry heater, wherein the slurry heater apparatus is adapted such that it can be reconfigured to form a subsequent slurry heater also comprising at least two heating sections connected in fluid communication in series, wherein the subsequent slurry heater has a different total length and/or a different average internal diameter than the initial slurry heater.

The present invention allows the slurry heater apparatus/ slurry heater to be configured differently depending on the product being produced.

A "heating section" as used herein is a single length of pipe through which a fluid can flow in use, and which is provided with means by which heat can be applied to the fluid. The heating sections are generally linear. Heat is usually applied by indirect heat exchange through the walls of the pipe from an external heating fluid, such as water or steam. The two ends of a heating section are defined by means to connect the two ends to the immediately upstream and downstream components. Upstream and downstream components may be any suitable upstream or downstream components, and include:
  i) upstream or downstream heating sections,
  ii) other upstream or downstream equipment, such as an upstream slurry source and a downstream separation vessel, and
  iii) other lengths of pipe, such as connecting sections, which are not themselves heated but which connect to other slurry heating sections or other components.

The means to connect are typically flanges.

A "slurry heater" as used herein comprises two or more heating sections connected in series to form continuous flow path. The slurry heater will generally provide a flow path from a slurry source, for example a slurry polymerisation reactor, to a separations vessel, for example a flash or other separation tank. The slurry heater as defined herein has a total length from the entrance to the first heated section to the exit of the last heated section in series, including any other sections (non-heated sections) within said flow path.

The "slurry heater apparatus" as used herein comprises a plurality of heating sections which can be configured in any particular configuration to form at least one slurry heater. In both its initial and subsequent configurations at least two of these heating sections are connected in series to form slurry heaters.

The slurry heater apparatus must comprise at least 3 different heating sections (although it will usually comprise considerably more than this as discussed further below) in order that it may form the initial and subsequent slurry heaters. In each configuration, the heating sections which are configured to form a slurry heater may be considered as "operational".

In particular, in a preferred embodiment there may be provided a slurry heater apparatus comprising
  i) at least two initially operational heating sections connected in fluid communication in series to form an initial slurry heater, and
  ii) optionally one or more further heating sections which do not form part of the initial slurry heater,
  wherein the slurry heater apparatus is adapted such that it can be reconfigured to form a subsequent slurry heater comprising at least two subsequently operational heating sections, wherein:
  a) the at least two subsequently operational heating sections of the subsequent slurry heater comprise one or more of the further heating sections connected in fluid communication in series with at least one of the initially operational heating sections, and/or
  b) one or more of the initially operational heating sections is not present in the subsequent slurry heater.

As should be clear from above, the term "operational" as used herein to apply to heating sections means that, in use in a particular configuration, slurry would flow through the heating sections i.e. the sections would be part of an operational slurry heater. For avoidance of doubt, it should be noted that the term "operational" does not require that each operational heating section is supplying heat to the slurry in use, although at least one operational heating section in a slurry heater should do so, and preferably each operational heating section present will do so.

The "further heating sections" in the preferred embodiment are sections which do not form part of the flow path of the initial slurry heater. Thus, slurry which flows through the operational heating sections in the initial slurry heater does not flow through the further heating sections. Such heating sections may also be referred to as "inoperational heating sections" where they are not connected in a particular configuration in a form that could be used as part of a slurry heater. Thus, no slurry flows through initially inoperational heating sections in the initial configuration even when the slurry heater apparatus is in use. (Note that a flush, for example with diluent, can be supplied to inoperational heating sections).

The terms "initial"/"initially" and "subsequent"/"subsequently" refer to the slurry heater/heating sections before and after reconfiguration respectively.

Thus, as used herein:
A) "initially operational heating sections" refers to heating sections which form part of the initial slurry heater,
B) "subsequently operational heating sections" refers to heating sections which form part of the subsequent slurry heater,
C) "initially inoperational heating sections" refers to heating sections which are not "operational" in the initial slurry heater configuration, and
D) "subsequently inoperational heating sections" refers to heating sections which are not "operational" in the subsequent slurry heater configuration.

In the present invention the subsequent slurry heater has a different total length and/or a different average internal diameter than the initial slurry heater. A change in total length can be obtained, for example, by changing the total number of heating sections in a slurry heater, such as by removing one or more heating sections or adding one or more heating sections to the initial slurry heater. A change in average internal diameter can be obtained, for example, by replacing a heating section of one internal diameter with a heating section with a different internal diameter, or by adding a further heating section which has an internal diameter different to the average internal diameter of the initial slurry heater. It will be apparent that numerous other types of reconfiguration may be made which can result in a change in total length and/or average internal diameter.

In one embodiment, at least one of the heating sections which form the initial slurry heater also forms a heating section of the subsequent slurry heater.

In one example, this may be achieved be adding one or more further heating sections to one of the initially operational heating sections of the initial slurry heater. Where said initially operational heating section is not the last heating section of the initial slurry heater then it must first be disconnected from a downstream initially operational heating section to which it is initially connected, and then connected to the further heating section.

Alternatively, where said initially operational heating section is initially the last heating section of the initial slurry heater then it must first be disconnected from downstream pipe-work, and then connected to the further heating section.

In either case the added further heating section can become the last operational heating section in the subsequent slurry heater, or one or more other operational heating sections may be added downstream, either more further heating sections or heating sections which were initially operational.

In a second embodiment one or more of the initially operational heating sections is not present in the subsequent slurry heater. This may be achieved for example by simply removing one (or more) of the initially operational heating sections. Said at least one initially operational heating section to be removed is disconnected from upstream and downstream heating sections or pipework as appropriate, and a new connection of the remaining heating sections or pipework made.

It will be clear that both initially operational heating sections can be removed and further heating sections added during the reconfiguration.

For ease of description for the purposes of the present invention reference will be made to "slurry" in the heating sections of the slurry heaters or in the slurry heaters as a whole, although it should be noted that it is usually the intention of the heating in the slurry heater overall that the diluent in the slurry entering the slurry heater is at least partially vaporised by the time it exits the slurry heater. Therefore in some heating sections within the slurry heater configurations, in particular in the latter heating sections, no liquid may be present at all. Reference to "slurry" in the heating sections of the slurry heaters is intended to encompass such streams.

The slurry heater is formed of heating sections, which in general terms are sections of pipe through which the withdrawn slurry is passed in use, and through which heat can be provided to the slurry. The amount of heat provided in each heating section should be sufficient such that within the slurry heater formed from the heating sections vaporisation of the liquid diluent component of the slurry occurs. Preferably the stream is heated so that the exit stream is at greater than 10° C., preferably greater than 15° C., most preferably greater than 20° C. above the dew point of the stream. The amount of heat supplied should however be less than will cause the temperature of the polymer solids to exceed the softening and/or sintering temperature of the polymer solids at any point.

The preferred dimensions of each slurry heater and its/their operation is preferably as described in general terms in WO 2009/127645.

There are no specific limits on the lengths of the individual heating sections, although for practical purposes such as ease of handling, each section is usually no greater than 20 meters in length. Usually each heating section is at least 2 meters in length such that very large numbers of sections are not required.

In a particular configuration, a slurry heater preferably comprises between 5 and 50 heating sections. The total length of the heating sections (ignoring any unheated sections) will generally be at least 50 m. The length of the heating sections may be up to 500 m. Preferably the length of the heating sections will be between 70 and 300 m.

The overall length of a slurry heater (including both the heating sections and any connecting sections) may be at least 70 m, more usually is at least 80 m. The length may be up to 600 m, and preferably is between 80 and 350 m in length.

Each heating section usually has an internal diameter, d, of at least 20 mm. Usually each heating section has an internal diameter of between 40 and 200 mm, more preferably between 60 mm and 150 mm, and most preferably between 70 mm and 110 mm. (The heating sections are usually defined in "standard pipe sizes" such as 3", 4", 5" and 6" and rated for the temperature and pressure of use, these sizes however generally referring to the external diameter of the internal pipe).

The average internal diameter of each slurry heater is preferably between 60 and 150 mm, and most preferably between 70 mm and 110 mm.

Each operational heating section is connected to the next by a suitable connection. Generally each heating section is formed of a linear section of pipe (through which the slurry flows in use, and with a heating jacket surrounding it, through which the heating fluid flows in use).

A heating section may be connected to one or more other heating sections linearly, but generally, in order to maintain a compact overall structure, curved connecting sections are provided between some heating sections. For example, a set of 4 sections may be provided linearly and vertically orientated, and after the fourth section a connecting section in the form of a 180° connecting elbow (which is a bend which causes flow to turn through 180°, such as a U-bend) is provided to connect to the next 4 sections which may then be vertically orientated in parallel to the first 4 sections. Thus, the entire slurry heater may be formed from sets of 4 linear but vertically orientated sections through which, in use, slurry would flow alternately upwards and downwards. This minimises the spatial ("footprint") requirements of a slurry heater whilst allowing the required overall length. It will be apparent that a similar configuration could be formed with sets of horizontally orientated sections, or that combinations of vertically and horizontally orientated sections could be used, connected by 90° connecting sections Any connecting elbows are generally curved pipes with internal diameters equivalent to those of the upstream and downstream heating sections i.e. which has a radius at its upstream end corresponding to the radius of the upstream operational heating section and a radius at the downstream end corresponding to the radius of the downstream operational heating section (which may or may not be different, but is preferably the same).

Elbows in pipes may be referred to as "long radius" and "short radius" depending on the radius of curvature of the elbow compared to the nominal diameter of the pipe. "Long radius" elbows are preferred in the present invention, this referring to elbows where the radius of the centreline of the elbow is 1.5 times or more the nominal diameter of the pipe which forms the elbow.

The elbows are generally not externally heated.

It should be noted that not all heating sections have to have the same length. In addition, and although not every operational heating section need be larger in diameter than the previous heating section, it is generally preferred that the diameter gets larger in the overall direction of slurry flow (or vapour/solids flow once the liquid is vaporised).

Thus, it is preferred that the ratio of a slurry heater's outlet diameter $D_o$ to its inlet diameter $D_i$, $D_o/D_i$ is greater than 1, preferably is between 1.2 and 10. Typically it is at least 1.3, and commonly at least 1.4. However this ratio is preferably no more than 4, and more preferably no more than 2, with a maximum of 1.9 being most preferred. It is also preferred that the ratio of the slurry heater's diameter 80% along its length, $D_{80}$, to the diameter 20% along its length, $D_{20}$, is greater than 1, preferably greater than 1.2 and more preferably greater than 1.3.

If the slurry heater increases in diameter along its length, it is preferred that the increase occurs in discrete steps rather than continuously, with intermediate heating sections of the slurry heater having a constant diameter. Typically there are one, two or three increases in diameter along the length of the slurry heater, usually created by a conical connecting piece between the two heating sections of different diameter.

Taking an example to illustrate the above, an initial slurry heater comprises 20 heating sections each of approximately 9.5 m in length. Sets of 4 heating sections are connected in a linear manner and vertically orientated (total "height" of 38 m), and connected to the next set of 4 by a 180° curved pipe connecting section. Thus, the 20 heating sections are arranged in 5 vertical "legs".

The first 6 heating sections (in direction of slurry flow), may be formed of 3" nominal diameter pipe, which expands between the $6^{th}$ and $7^{th}$ sections (half-way along the second leg) to 4" nominal diameter pipe. Sections 7 to 14 may be formed of 4" nominal diameter pipe, which expands between the $14^{th}$ and $15^{th}$ sections (half-way along the $4^{th}$ leg) to 5" nominal diameter pipe. Sections 15 to 20 may be formed of 5" nominal diameter pipe.

On reconfiguration, a further 8 heating sections (which are inoperational in the initial configuration i.e. are "initially inoperational heating sections") are connected after the $20^{th}$ section to form a subsequent slurry heater. The additional 8 heating sections are each of 9.5 m in length, are formed of 5" nominal diameter pipe and are arranged in two sets of 4. Thus, the subsequent slurry heater comprises 28 operational heating sections arranged in 7 legs, and could provide additional heating (compared to the initial slurry heater) due to the additional heating sections.

Whilst the above is exemplified for the simple case where the diameter is constant in a particular heating section, and expansion occurs between heating sections, it is also possible, although not preferred, that the diameter varies, in particular increases in the direction of flow, within a heating section.

As used herein, the total length of a slurry heater is the length from the start of the first heating section to the end of the last heating section, and includes all connectors between heating sections. Where any section e.g. a connecting elbow, is non-linear, then the length of that section is taken as the length of the path through the centreline e.g. of the centreline of the elbow.

As used herein, the average internal diameter of a slurry heater is the internal diameter averaged over the total length, again being determined from the start of the first heating section to the end of the last heating section, and including all connectors between heating sections. Mathematically this can be represented as Average internal diameter=sum($L_i D_i$)/sum $L_i$, where $L_i$ is the total length having a diameter $D_i$, and the sum is calculated for each different diameter $D_i$ present in the slurry heater.

Where the subsequent slurry heater has a different total length than the initial slurry heater the difference is usually at least 10% relative to the total length of the initial slurry heater, preferably at least 20%.

Where the subsequent slurry heater has a different average internal diameter than that of the initial slurry heater the difference is usually at least 10% relative to the average internal diameter of the initial slurry heater, preferably at least 20%.

Typical pressure at the entry to the first heating section of a slurry heater (slurry heater inlet) $P_i$, is 5-40 bara (0.5-4 MPa), preferably 10-25 bara (1-2.5 MPa). Pressure at the outlet of the last heating section (slurry heater outlet) $P_o$ is typically 1.5-20 bara (0.15-2 MPa), preferably 7-11 bara (0.7-1.1 MPa).

The slurry heaters are generally positioned between a polymerisation reactor and a degassing vessel, and the pressure drop in the slurry heater is typically between 5% and 50%, preferably between 10 and 35%, of the total pressure drop between the polymerisation reactor and the entry to the degassing vessel.

The polymer-containing stream is preferably heated such that at least 90 mol %, preferably at least 98 mol % and most optimally 100 mol % of the hydrocarbon fluids withdrawn from the polymerisation reactor are vaporised before exiting the slurry heater. The degassing vessel typically operates at a pressure greater than 2 bara (0.2 MPa), most preferably between 6 bara and 12 bara (0.6 and 1.2 MPa). It is most preferred to maintain a pressure drop across the length of a slurry heater of less than 0.5 bar per tonne/hour (50 kPa per tonne/hour) of polymer production, most preferably between 0.1 bar per te/h and 0.3 bar per te/h (10 kPa per tonne/hour and 30 kPa per tonne/hour). It is preferred that the solids content of the polymer-containing stream is between 35 wt % to 70 wt %, most preferably between 50 wt % and 65 wt % at the slurry heater inlet.

Pressure drop may be controlled by control of the velocities in the slurry heater, which can itself be controlled by the number of slurry heaters provided in parallel, by the number and diameters of the slurry heater sections in a particular slurry heater and/or by the amount of heating supplied to the slurry in a slurry heater.

It is preferred that the velocity of the stream at the entry into a slurry heater does not vary by more than 15%, preferably no more than 5%, in any 30 second period. One way in which this can be achieved is by using a continuous rather than discontinuous off-take from the polymerisation reactor.

The flow rate of a polymer-containing stream withdrawn from the polymerisation reactor may be controlled using a pressure or flow control valve prior to the slurry heater inlet. The control valve is preferably designed to provide a pressure drop of between 45% and 90%, most preferably 50% and 80%, of the pressure drop between the reactor and the entry to a downstream degassing vessel. As noted above, the slurry heater is preferably designed to have a pressure drop between 5% and 50%, most preferably between 10 and 35%, of the pressure drop between the reactor and the entry to the degassing vessel. The ratio of the pressure drop across the control valve to the pressure drop across the slurry heater is typically between 0.8 and 10, most preferably between 1 and 2.

The slurry heater of the first aspect is generally part of a slurry heater apparatus, the slurry heater apparatus including a set of available slurry heating sections from which one or more slurry heaters may be formed. "Available" slurry heating sections means all those which can be configured to be part of a slurry heater, even if not configured as such in a particular configuration, and this includes those designated as "operational" and those designated as "further" or "inoperational". For example, this includes all 28 heating sections noted above even when 8 of them are inoperational (in the initial configuration).

In the subsequent configuration, all of the available heating sections in a slurry heater apparatus may be configured to form the subsequent slurry heater, or certain heating sections may be "subsequently inoperational".

For example, a slurry heater apparatus for a single slurry heater as in the above example may comprise 28 heating sections in total ("available slurry heating sections"), and in the initial configuration 20 of these are configured to form an initial slurry heater, with the other 8 "initially inoperational". All of the "available" heating sections could be used in the subsequent slurry heater as exemplified above, or the subsequent slurry heater may only utilise some of the 28 available sections. For example, the subsequent slurry heater could utilise the twenty-two 4" and 5" diameter sections, but none (or only some) of the six 3" diameter sections.

In general, the slurry heater apparatus comprises heating sections which may be used to form more than one slurry heater in certain or in all configurations. For example, and preferably, there may be two or more initial slurry heaters and two or more subsequent slurry heaters after reconfiguration. Preferably there are two or three slurry heaters in each configuration. Examples of this are described further elsewhere herein. It will however be clear that in a slurry heater apparatus configured to provide multiple slurry heaters there may be significant numbers of heating sections ("available slurry heater sections"), for example from 5 to 150, and more typically from 30 to 100. For example, 3 withdrawal lines each configured with 28 heating sections requires 84 "operational heating sections" even if no other "inoperational heating sections" are present.

In use the (or a) slurry heater according to the first aspect is generally associated with a withdrawal line for withdrawing slurry from a slurry polymerisation reactor, preferably a slurry loop polymerisation reactor.

In general, a slurry loop polymerisation reactor may have a plurality of withdrawal lines, each having a slurry heater associated therewith. The present invention is particularly useful in such systems since it allows flexibility in the overall slurry heating. Thus, the slurry heater apparatus may comprise at least two initial slurry heaters. Similarly, the slurry heater apparatus after reconfiguration may comprise at least two subsequent slurry heaters.

The at least two slurry heaters in either configuration (i.e. either "initial" or "subsequent" slurry heaters) are in parallel. "Parallel" in this context means that the slurry heaters provide alternative flow paths for slurry exiting the reactor. (Slurry entering one slurry heater does not subsequently flow through the other.)

In one example, the slurry may be withdrawn from the reaction loop through a plurality of settling legs. Using settling legs, slurry is allowed to settle, and concentrate, in the leg, which is then periodically opened to discharge the slurry. Each settling leg may open into a single slurry heater line, but preferably several settling legs may be operated to open in a sequence into a common slurry heater. By combining several flows into a single slurry heater a more constant flow in obtained in a slurry heater, and the total number of slurry heaters required for a particular configuration can be minimised, for example, in the range 1 to 4.

Alternatively, the slurry may be withdrawn from the reaction loop through a plurality of continuously open withdrawal lines, usually comprising throttled valves to control slurry flow. In this case it is preferred that each withdrawal line (which is in use in a particular configuration) is associated with a separate slurry heater. Usually 1 to 4 slurry heaters are required.

As a particular example, there is also provided a slurry heater apparatus comprising at least two initial slurry heaters provided in parallel, said initial slurry heaters each comprising at least two initially operational heating sections connected in series, wherein the slurry heater apparatus is adapted such that it can be reconfigured to form a subsequent slurry heater comprising at least two subsequently operational heating sections connected in series said subsequent slurry heater comprising one or more additional operational heating sections to and/or being without one or more of the initially operational heating sections of either of the two initial slurry heaters.

For avoidance of any doubt, by "comprising one or more additional operational heating sections to and/or being without one or more of the initially operational heating sections of either of the initial slurry heaters" is meant that the subsequent slurry heater is different to any of the at least two initial slurry heaters.

Preferably there are at least two, for example three, subsequent slurry heaters provided in parallel and each comprising at least two subsequently operational heating sections connected in series, and each comprising one or more additional operational heating sections to and/or being without one or more of the initially operational heating sections of either of the at least two initial slurry heaters.

The slurry heater apparatus preferably comprises two or more, for example three or more, initially inoperational heating sections which become subsequently operational heating sections in the one or more subsequent slurry heaters.

Preferably the "at least two initial slurry heaters provided in parallel" comprise at least three initial slurry heaters provided in parallel.

As a simple example of a change in configuration according to the second aspect of the present invention, there can be considered a first polymer grade produced at relatively high production rate and at relatively high temperature where the polymer may be withdrawn using three withdrawal lines, and on each line may be provided an "initial slurry heater" of 20 initially operational heating sections in length (for example as described previously).

It may then be desired to change production to a different polymer grade, which is produced at a relatively lower temperature but also at a lower overall production rate. Based on the production rate only two withdrawal lines may be required. But if it is desired to heat the slurry to a similar overall temperature as in the first polymer grade more heat will need to be provided to the slurry to compensate for the lower initial slurry (reaction) temperature. Thus, two withdrawal lines may be provided each with a "subsequent slurry heater" of 28 subsequently operational heating sections in length by reconfiguring the available heating sections. The additional length of the subsequent slurry heaters provides sufficient additional heat to each stream to compensate for the fact that the slurry withdrawn from the reactor is at a lower temperature in the first place whilst also allowing to maintain an acceptable pressure drop in the slurry heater.

Each heating section, the slurry heater and the slurry heater apparatus are preferably as already described, for example, in the dimensions and numbers of heating sections present.

Each set of operational heating sections are connected to form a slurry heater. Preferably each slurry heater is associated with an individual withdrawal line for withdrawing slurry from a slurry polymerisation reactor, preferably a slurry loop polymerisation reactor.

The reconfiguration according to the present invention requires that certain heating sections are adapted to enable disconnection from each other, and the new connection of certain heating sections to other heating sections. The heating sections should be designed to enable such connections and disconnections to be repeatedly practised with relative ease. This can include flanges that can be connected and disconnected. Alternatively, or in addition, suitable valves can be provided which enable heating sections to be fluidly isolated from other heating sections in the initial configuration and the new connections/flow paths to heating sections in the subsequent configuration to be formed.

A relatively simple example of a means to reconfigure is a by-pass line with valves that allow certain heating sections to be either utilised or by-passed depending on the configuration. For example, where there are a series of parallel vertical "legs" as described previously, a line equipped with three-way valves at either end and which connects a heating section in one leg to a heating section in a subsequent leg in series can easily allow reconfiguration to connect and disconnect the intervening heating sections from the overall flow path.

In general, this means that the locations of the various heating sections in the apparatus relative to each other are carefully planned. One particularly advantageous way to achieve this is to provide an array of "legs" in parallel (each leg comprising one or more heating sections) as already described. The downstream end of one leg can be configured to have the upstream ends of a number of other legs adjacent to it, and a 180° curved connection may be moved relatively easily from connecting a first initially operational heating section (at the downstream end of a first leg) to a second initially operational heating section (at the upstream end of a second leg) to instead connect the first heating section to a different heating section (at the upstream end of a different leg) to become first and second subsequently operational heating sections.

In use, some of the ends of the operational legs will be the "downstream" ends (where the "slurry" flow exits the relevant leg/heating section) and the others will be "upstream" ends (where the "slurry" flow enters the relevant leg/heating section). Generally each heating section will be categorised by a specific direction of flow through it in all configurations in which it is used. Thus, whilst all of the ends can be co-planar, it is preferred that the "downstream" ends reside in one plane, and the "upstream" ends reside in a separate plane. In this way it is simple for an operator to identify the downstream and upstream ends, and ensure that a downstream end is always connected to an upstream end of a subsequent heating section/leg.

Whilst it is possible, for maximum flexibility, that any heating sections can be connected and disconnected to/from each other as desired, this is not generally required, and in practise it is sufficient that a minimum number of sections are reconfigurable in order to enable the required different configurations.

For example, whatever the configuration, it may be that many of the operational heating sections of some or all of the slurry heaters may be the same, in which case these heating sections do not need to be disconnectable from each other. In practise, most polymers can be produced efficiently using one of only 3 or 4 different possible slurry heater configurations, and reconfiguring between any two configurations can often be done with 4 or less disconnections or new connections.

As noted already, in use the slurry heater is generally associated with a withdrawal line for withdrawing slurry from a slurry polymerisation reactor, preferably a slurry loop polymerisation reactor.

In a third aspect, the present invention provides a process for the production of polymer product in a slurry polymerisation process, which slurry polymerisation process comprises a slurry heater for heating a stream of polymer product slurry withdrawn from a slurry reactor, wherein said process comprises reconfiguring the slurry heater from an initial slurry heater configuration to a subsequent slurry heater configuration.

The reconfiguration of the slurry heater can be done during a shut-down of the polymerisation process in such a reactor, but it is most usefully done during a product transition.

Thus, in a fourth aspect, the present invention provides a method for transitioning from the production of a first polymer product to the production of a second polymer product in a slurry polymerisation process, which slurry polymerisation process comprises a slurry heater for heating a stream of polymer product slurry withdrawn from a slurry reactor, wherein said method comprising reconfiguring the slurry heater from an initial slurry heater configuration to a subsequent slurry heater configuration.

In these third and fourth aspects, the preferred features of the slurry heater are as recited in the first and second aspects already described. More preferably, the slurry polymerisation process comprises a slurry heater apparatus as already described.

The slurry polymerisation reactor is preferably a loop slurry polymerisation reactor. Such reactors are well-known, and comprise series of horizontal and/or vertical legs connected by elbows to form a continuous flow path. The preferred reactors according to the present invention comprise a series of vertical legs, such as 4, 6, 8 or more vertical legs. The preferred reactors have a volume generally in the range 50 to 250 m$^3$. The internal diameter of the reactors can vary, typically from 450 to 800 mm.

The reactors generally have at least 2 withdrawal ports, and withdrawal may be performed continuously or discontinuously as known in the art. Continuous withdrawal is generally preferred since this results in a more even flow through the slurry heater, which is more efficient.

More than one reactor may be provided in a slurry polymerisation process. For example, it is known to operate loop slurry polymerisation reactors in series, with a slurry of polymer produced in a first reactor being passed to a second reactor wherein further polymerisation occurs. Slurry of polymer withdrawn from the second reactor may then be passed to a slurry heater according to the present invention.

The invention claimed is:

1. A process for the production of polymer product in a slurry polymerisation process, which slurry polymerisation process comprises a slurry heater for heating a stream of polymer product slurry withdrawn from a slurry reactor, wherein said process comprises reconfiguring the slurry heater from an initial slurry heater configuration to a subsequent slurry heater configuration and further wherein the slurry heater is reconfigured to form a subsequent slurry heater having a different total length and/or a different average internal diameter than the initial slurry heater.

2. A process according to claim 1 wherein the slurry heater apparatus comprises at least 3 different heating sections, at least two of said heating sections being connected in fluid communication in series to form the initial slurry heater, wherein the slurry heater apparatus is adapted such that it can be reconfigured to form said subsequent slurry heater, said subsequent slurry heater also comprising at least two of said heating sections connected in fluid communication in series.

3. A method for transitioning from the production of a first polymer product to the production of a second polymer product in a slurry polymerisation process, which slurry polymerisation process comprises a slurry heater for heating a stream of polymer product slurry withdrawn from a slurry reactor, wherein said method comprising reconfiguring the slurry heater from an initial slurry heater configuration to a subsequent slurry heater configuration and further wherein the slurry heater is reconfigured to form a subsequent slurry heater having a different total length and/or a different average internal diameter than the initial slurry heater.

4. A method according to claim 3 wherein the slurry heater apparatus comprises at least 3 different heating sections, at least two of said heating sections being connected in fluid communication in series to form the initial slurry heater, wherein the slurry heater apparatus is adapted such that it can be reconfigured to form said subsequent slurry heater, said subsequent slurry heater also comprising at least two of said heating sections connected in fluid communication in series.

5. A process according to claim 2 wherein each heating section is between 2 and 20 meters in length.

6. A process according to claim 2 wherein the overall length of the initial and subsequent slurry heaters are at least 50 m and up to 500 m.

7. A process according to claim 2 wherein each heating section has an internal diameter, d, of at least 20 mm and up to 200 mm.

8. A process according to claim 2 wherein the slurry heater apparatus comprises in total 5 to 150 heating sections.

9. A process according to claim 8 wherein the slurry heater apparatus comprises in total 30 to 100 heating sections.

10. A process according to claim 2 wherein there are provided at least two initial slurry heaters each comprising at least two heating sections connected in series.

11. A process according to claim 2 wherein there are provided at least two subsequent slurry heaters each comprising at least two heating sections connected in series.

12. A process according to claim 10 wherein there are provided at least two subsequent slurry heaters each comprising at least two heating sections connected in series.

13. A method according to claim 4 wherein each heating section is between 2 and 20 meters in length.

14. A method according to claim 4 wherein the overall length of the initial and subsequent slurry heaters are at least 50 m and up to 500 m.

15. A method according to claim 4 wherein each heating section has an internal diameter, d, of at least 20 mm and up to 200 mm.

16. A method according to claim 4 wherein the slurry heater apparatus comprises in total 5 to 150 heating sections.

17. A method according to claim 16 wherein the slurry heater apparatus comprises in total 30 to 100 heating sections.

18. A method according to claim 4 wherein there are provided at least two initial slurry heaters each comprising at least two heating sections connected in series.

19. A method according to claim 4 wherein there are provided at least two subsequent slurry heaters each comprising at least two heating sections connected in series.

20. A method according to claim 18 wherein there are provided at least two subsequent slurry heaters each comprising at least two heating sections connected in series.

* * * * *